US012477324B2

(12) United States Patent
Sambandan et al.

(10) Patent No.: US 12,477,324 B2
(45) Date of Patent: Nov. 18, 2025

(54) DEVICE MANAGEMENT SYSTEM FOR RADIO ACCESS NETWORK WITH INTERFACE TO HYPERSCALE SERVICES PORTAL

(71) Applicant: Outdoor Wireless Networks LLC, Richardson, TX (US)

(72) Inventors: Devaraj Sambandan, Bengaluru (IN); Gaurav Mittal, Bangalore (IN); Manikanda Kumar Thoguluva Kannan, Bengaluru (IN); Tarun Dewan, San Jose, CA (US); Thomas Forner, Celina, TX (US)

(73) Assignee: Outdoor Wireless Networks LLC, Richardson, TX (US)

( * ) Notice: Subject to any disclaimer, the term of this patent is extended or adjusted under 35 U.S.C. 154(b) by 553 days.

(21) Appl. No.: 17/936,513

(22) Filed: Sep. 29, 2022

(65) Prior Publication Data

US 2023/0101566 A1 Mar. 30, 2023

(30) Foreign Application Priority Data

Sep. 29, 2021 (IN) .............................. 202141044231

(51) Int. Cl.
*H04L 41/00* (2022.01)
*H04L 67/10* (2022.01)
(Continued)

(52) U.S. Cl.
CPC ............. *H04W 8/24* (2013.01); *H04W 48/16* (2013.01)

(58) Field of Classification Search
None
See application file for complete search history.

(56) References Cited

U.S. PATENT DOCUMENTS 11,438,325 B2 * 9/2022 Begun ................. G06F 9/45558
11,538,593 B2 * 12/2022 Ohad ...................... G16Z 99/00
(Continued)

FOREIGN PATENT DOCUMENTS

WO 2021035171 A2 2/2021

OTHER PUBLICATIONS

International Searching Authority, "International Search Report and Written Opinion", from PCT Application No. PCT/US2022/077229, from Foreign Counterpart to U.S. Appl. No. 17/936,513, filed Jan. 18, 2023, pp. 1 through 8, Published in: KR.

(Continued)

*Primary Examiner* — Sithu Ko
(74) *Attorney, Agent, or Firm* — Fogg & Powers LLC

(57) ABSTRACT

To enable a private enterprise to subscribe to wireless service provided at a site of the private enterprise using a private radio access network (RAN), one embodiment is directed to a hyperscale network configured to: obtain subscription information for providing the wireless; determine initial configurations for physical entities deployed at the site; store the determined initial configurations in vendors clouds; deploy, in the hyperscale network, virtual entities needed to provide the wireless service; instruct the private enterprise to cause the physical entities deployed at the site to perform initial bootstrap processes whereby the physical entities download the determined initial configurations for use thereby in communicating with at least one of the virtual entities; and provide final configurations to the physical entities and the virtual entities for use thereby in configuring the physical entities and the virtual entities to provide the wireless service at the site using the RAN.

26 Claims, 2 Drawing Sheets

Figure 1:
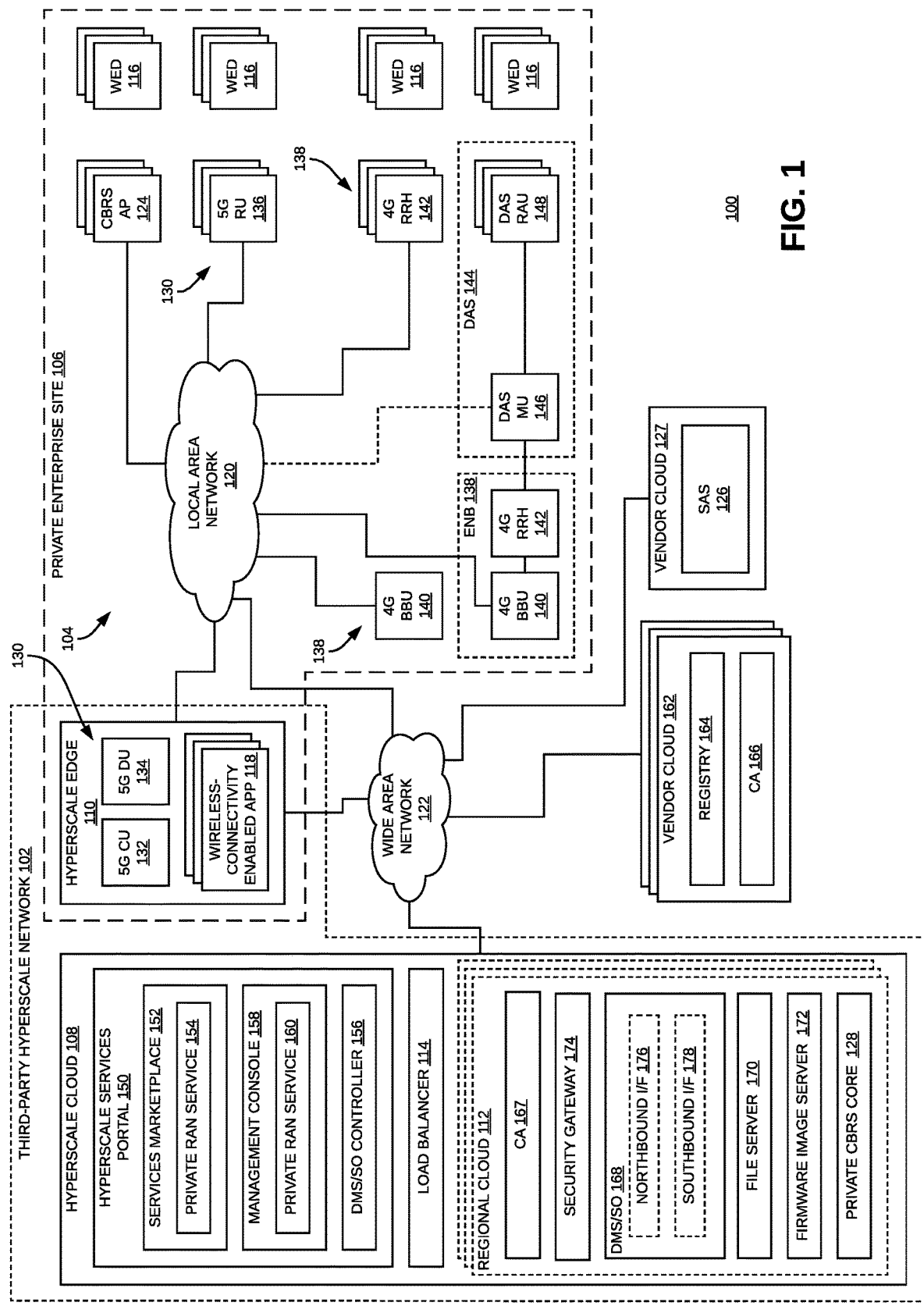

(51) Int. Cl.
  *H04W 8/24* (2009.01)
  *H04W 48/16* (2009.01)

(56) References Cited

U.S. PATENT DOCUMENTS

| | | | | |
|---|---|---|---|---|
| 11,630,700 | B2* | 4/2023 | Daniali | G06F 9/5027 |
| | | | | 718/104 |
| 11,757,727 | B2* | 9/2023 | Metaxas | H04L 41/14 |
| | | | | 709/220 |
| 11,922,074 | B1* | 3/2024 | Thomason | G06F 3/0604 |
| 2007/0010245 | A1 | 1/2007 | Levitan | |
| 2019/0163514 | A1 | 5/2019 | Radunovic et al. | |
| 2019/0317812 | A1 | 10/2019 | Gebara et al. | |
| 2019/0342797 | A1 | 11/2019 | Fu et al. | |
| 2020/0136943 | A1 | 4/2020 | Banyai et al. | |
| 2021/0120077 | A1 | 4/2021 | Guim Bernat et al. | |
| 2022/0200910 | A1* | 6/2022 | Baldi | H04L 47/20 |
| 2023/0064284 | A1* | 3/2023 | Gao | H05K 7/20836 |
| 2023/0199480 | A1* | 6/2023 | Tao | H04L 67/1021 |
| | | | | 370/338 |
| 2024/0154935 | A1* | 5/2024 | Szilágyi | H04L 67/51 |
| 2024/0377131 | A1* | 11/2024 | Lochner | F25J 3/04872 |

OTHER PUBLICATIONS

European Patent Office, "Extended European Search Report", dated Jul. 11, 2025, from EP Application No. 22877552.4, from Foreign Counterpart to U.S. Appl. No. 17/936,513, pp. 1 through 16, Published: EP.

* cited by examiner

DEVICE MANAGEMENT SYSTEM FOR RADIO ACCESS NETWORK WITH INTERFACE TO HYPERSCALE SERVICES PORTAL

CROSS-REFERENCE TO RELATED APPLICATIONS

This application claims the benefit of Indian Provisional Patent Application Serial No. 202141044231, filed on Sep. 29, 2021, which is hereby incorporated herein by reference in its entirety.

BACKGROUND

Entities used to implement public radio access networks (for example, Fourth Generation (4G) Long-Term Evolution (LTE) radio access networks and Fifth Generation (5G) New Radio (NR)) are typically managed by some type of management system (also referred to here as a "device management system" or "DMS"). These device management systems are typically deployed by the wireless service operator implementing the public radio access network. As a result, such device management systems are typically designed to satisfy the needs of such wireless service operators. However, device management systems primarily designed to support the needs of wireless service operators implementing public radio access networks may not be suitable for other deployment scenarios.

SUMMARY

One embodiment is directed to a system for enabling a private enterprise to subscribe to wireless service provided at a site of the private enterprise using a private radio access network comprising one or more physical entities deployed at the site. The system comprises a third-party hyperscale network comprising a hyperscale cloud and a hyperscale edge. The hyperscale edge is deployed at the site of the private enterprise and the hyperscale cloud is deployed remote from the site of the private enterprise. The hyperscale network is configured to do the following: obtain subscription information for providing the wireless service at the site using the private radio access network; determine initial configurations for the one or more physical entities deployed at the site; store the determined initial configurations in one or more vendors clouds; deploy, in the hyperscale network, one or more virtual entities needed to provide the wireless service at the site using the private radio access network; instruct the private enterprise to cause the one or more physical entities deployed at the site to perform initial bootstrap processes whereby the one or more physical entities download the determined initial configurations stored in the one or more vendor clouds for use thereby in communicating with at least one of the one or more virtual entities; and provide final configurations to the one or more physical entities and the one or more virtual entities for use thereby in configuring the one or more physical entities and the one or more virtual entities to provide the wireless service at the site using the private radio access network.

Another embodiment is directed to a method of enabling a private enterprise to subscribe to wireless service provided at a site of the private enterprise using a private radio access network comprising one or more physical entities deployed at the site. The method comprises obtaining, by a third-party hyperscale network, subscription information for providing the wireless service at the site using the private radio access network. The third-party hyperscale network comprises a hyperscale cloud and a hyperscale edge. The hyperscale edge is deployed at the site of the private enterprise and the hyperscale cloud is deployed remote from the site of the private enterprise. The method further comprises: determining, by the hyperscale network, initial configurations for the one or more physical entities deployed at the site; storing the determined initial configurations in one or more vendors clouds; deploying, in the hyperscale network, one or more virtual entities needed to provide the wireless service at the site using the private radio access network; and instructing the private enterprise to cause the one or more physical entities deployed at the site to perform initial bootstrap processes whereby the one or more physical entities download the determined initial configurations stored in the one or more vendor clouds for use thereby in communicating with at least one of the one or more virtual entities; and providing final configurations to the one or more physical entities and the one or more virtual entities for use thereby in configuring the one or more physical entities and the one or more virtual entities to provide the wireless service at the site using the private radio access network.

Other embodiments are disclosed.

The details of various embodiments are set forth in the accompanying drawings and the description below. Other features and advantages will become apparent from the description,

DRAWINGS

FIG. 1 is a block diagram illustrating one exemplary embodiment of a system for enabling a private enterprise to subscribe to wireless service provided at a site of the private enterprise using a private radio access network.

Figure 2:
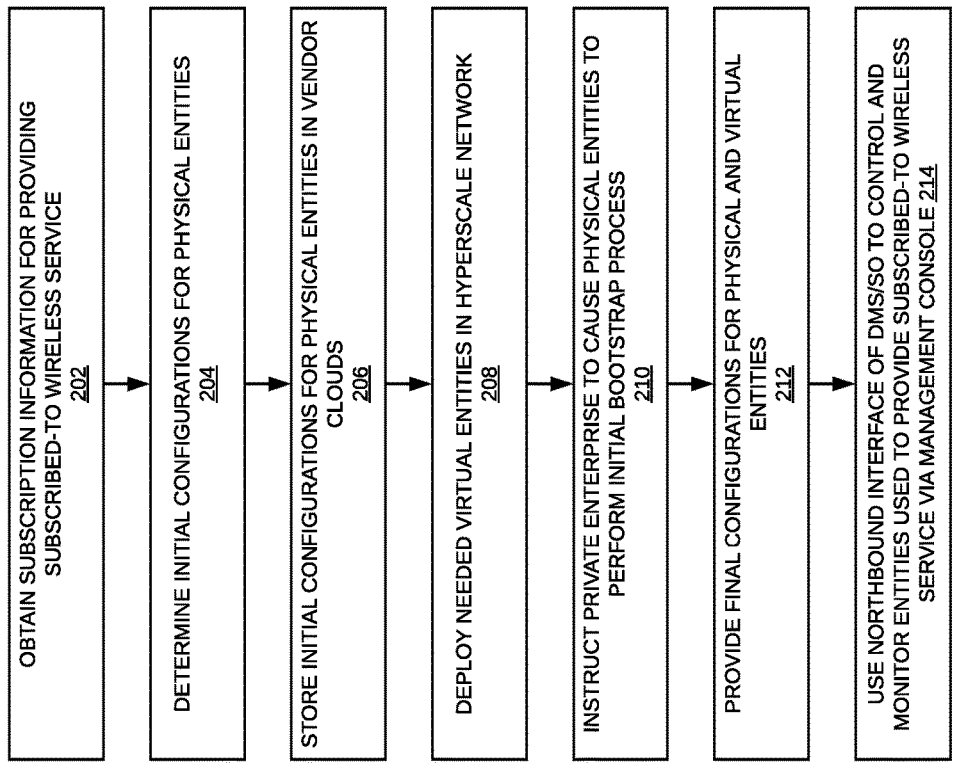

FIG. 2 comprises a high-level flowchart illustrating one exemplary embodiment of a method of enabling a private enterprise to subscribe to wireless service provided at a site of the private enterprise using a private radio access network comprising one or more physical entities deployed at the site.

Like reference numbers and designations in the various drawings indicate like elements.

DETAILED DESCRIPTION

FIG. 1 is a block diagram illustrating one exemplary embodiment of a system 100 for enabling a private enterprise to subscribe to wireless service provided at a site 106 of the private enterprise using a private radio access network 104. The system 100 comprises a third-party hyperscale network 102 and a private radio access network 104.

In the embodiment shown in FIG. 1, the private radio access network 104 is deployed by a private enterprise at a site 106 associated with the enterprise. As used here, a "private enterprise" refers to any organization (such as a for-profit, non-profit, or governmental corporation, company, or other corporate or governmental entity) the primary purpose of which is something other than providing wireless service to customers, members, or other stakeholders of the organization. For example, the private enterprise can include a factory or similar manufacturing facility that is implementing "smart manufacturing" or "Industry 4.0" techniques.

In the embodiment shown in FIG. 1, the third-party hyperscale network 102 is owned and operated by an organization other than the private enterprise. This organization is also referred to here as a "hyperscaler." The network 102 is "hyperscale" in that it is configured to scale appropriately as demand for resources provided by the network increases or decreases, possibly by very large amounts and/or very rapidly. In the embodiment shown in FIG. 1, the hyperscale network 102 is partitioned into a hyperscale cloud 108 and a hyperscale edge 110. The hyperscale "edge" 110 refers to the part of the hyperscale network 102 that is deployed on premise at the site 106 of the private enterprises, whereas the hyperscale cloud 108 is deployed remotely from the site 106 and the hyperscale edge 110 at geographically distributed facilities that are primarily controlled by the hyperscaler (for example, at geographically distributed data centers primarily controlled by the hyperscaler). In the exemplary embodiment, the hyperscale cloud 108 is further partitioned into multiple regional clouds 112. Applications deployed in the hyperscale cloud 108 can be deployed using multiple instances that are deployed in multiple regional clouds 112, where a load balancer 114 balances the demand and load for the application and shares and synchronizes the runtime state of the application, across the multiple instances.

Both the hyperscale cloud 108 and the hyperscale edge 110 can be implemented using scalable computer, memory, networking, and storage resources (for example, where scalability and reliability are provided in part using one or more types of virtualization technology). For example, the hyperscale cloud 108 and the hyperscale edge 110 can be implemented using a plurality of physical rack-mounted server computers (also referred to as physical worker nodes), where each such server computer is configured to execute software that is configured to implement the various functions and features described here as being implemented by or deployed in the hyperscale cloud 108 or the hyperscale edge 110 as the case may be. Each such physical server computer comprises one or more programmable processors for executing such software. The software comprises program instructions that are stored (or otherwise embodied) on or in an appropriate non-transitory storage medium or media (such as flash or other non-volatile memory, magnetic disc drives, and/or optical disc drives) from which at least a portion of the program instructions are read by the respective programmable processor for execution thereby. Both local storage media and remote storage media (for example, storage media that is accessible over a network), as well as removable media, can be used. Each such server computer also includes memory for storing the program instructions (and any related data) during execution by the respective programmable processor. Each such server computer also comprises one or more network interfaces (for example, one or more Ethernet network interfaces) to communicatively couple that server computer to one or more networks over which that server computer communicates. In such an example, one or more types of virtualization technology can be used with such server computers in order to provide scalability and reliability. Moreover, one or more of the server computers may also include hardware acceleration functionality for implementing computationally intensive functions implemented by or deploy in the hyperscale cloud 108 or the hyperscale edge 110 (for example, computationally intensive user-plane Layer 1 functions implemented by the 5G DU 134 described below).

In the embodiment shown in FIG. 1, the private radio access network 104 is configured to provide wireless end devices 116 with wireless connectivity to, among other things, the hyperscale edge 110.

In the embodiment shown in FIG. 1, one or more wireless-connectivity enabled applications 118 are deployed in the hyperscale edge 110 (shown in FIG. 1) and/or in the hyperscale cloud 108 (not shown). More specifically, each of the wireless-connectivity enabled applications 118 comprises software that is configured to be executed by and using the resources provided by the hyperscale edge 110 and/or the hyperscale cloud 108. The applications 118 are "wireless-connectivity enabled" in the sense that are specifically designed and configured to interact with one or more wireless end devices (WEDs) 116 in connection with implementing the application-layer functionality for which each such application 118 was designed.

For example, in one implementation, at least some of the wireless end devices 116 comprise Internet-of-Things (IoT) devices such as sensors, actuators, and gateways therefor and can be embedded in other devices (for example, to implement so-called "smart" devices that can be remotely monitored or controlled using one or more wireless-connectivity enabled applications 118) and/or can be attached to or otherwise associated with devices that do not natively include the functionality implemented by the associated IoT devices (for example, in a so-called "retro-fit" application where an otherwise "dumb" device is made "smart" by attaching or otherwise associating the IoT device with the dumb device).

Some of the wireless end device 116 can also comprise end user devices that are primarily used by human users (for example, smartphones, tablets, and personal computers) to interact with the applications 118 (for where, such human users employ such wireless end user devices to interact with an application 118 deployed in the hyperscale edge 110 using an custom "app" specifically designed to do and/or using a general-purpose web browser to access a web-based user interface for the application 118). In the embodiment shown in FIG. 1, such wireless end user devices wirelessly access one or more applications 118 deployed in the hyperscale edge 110 using the private radio access network 104. It is to be understood, however, that other end user devices can access and interact with one or more applications 118 deployed in the hyperscale edge 110 in other ways (for example, using a private or public wired connection or network, a different private wireless network (such as a WiFi network), and/or a public radio access network (for example, a public CBRS, 5G, and/or 4G radio access network).

In the embodiment shown in FIG. 1, the private radio access network 104 uses licensed radio frequency (RF) spectrum in order to provide wireless connectivity to the wireless end devices 116 to communicatively couple the wireless end devices 116 to, among other things, the hyperscale edge 110. It is to be understood that, more generally, the wireless connectivity provided by the private radio access network 104 can also be used to communicatively couple the wireless end devices 116 to other networks and resources (for example, one or more local area networks 120 deployed by the private enterprise at the site 106 (and one or more resources coupled thereto), one or more private wide area networks (and one or more resources coupled thereto), and/or one or more public wide area networks 122 such as the public Internet (and one or more resources coupled thereto).

Unless explicitly stated to the contrary, references to Layer 1, Layer 2, Layer 3, and other or equivalent layers (such as the Physical Layer or the Media Access Control (MAC) Layer) refer to layers of the particular wireless interface (for example, 4G LTE or 5G NR) used for wirelessly communicating with the wireless end devices 116. Furthermore, it is also to be understood that 5G NR embodiments can be used in both standalone and non-standalone modes (or other modes developed in the future) and the following description is not intended to be limited to any particular mode. Moreover, the software and hardware used to implement the private radio access network 104 is also generally referred to here as "entities" or "private radio access network entities."

For example, in the embodiment shown in FIG. 1, the private radio access network 104 supports the use of the Citizens Broadband Radio Spectrum (CBRS). The private radio access network includes one or more Citizens Broadband Radio Service Devices (CBSDs) 124 (also referred to here as "CBRS access points" 124) configured to use the Citizens Broadband Radio Spectrum and one or more wireless access protocols (such as 4G LTE and 5G NR) to provide wireless connectivity to one or more of the wireless end devices 116.

The private radio network 104 is configured to interact with a spectrum allocation server (SAS) 126, which in turn is configured to interact with an Environmental Sensing Capability (ESC) (not shown) and to dynamically manage access by the CBRS access points 124 to the Citizens Broadband Radio Spectrum in accordance with the relevant regulations and protocols promulgated for using the Citizens Broadband Radio Spectrum. In the embodiment show in FIG. 1, the SAS 126 is deployed and managed by the vendor of the SAS 126 in a respective cloud 127, which in the example shown in FIG. 1 is a vendor cloud 127 (though it is to be understood that the SAS 126 can be deployed in a different cloud). The CBRS access points 124 are configured to access the SAS 126 via the local area network 120 deployed at the site 106 (to which each CBRS access point 124 is connected via a wired connection) and a public wide area network 122 such as the Internet.

Also, a private evolved packet core 128 (labeled "CBRS core 128" in FIG. 1) is deployed in the hyperscale cloud 108 to provide required network core functionality for the underlying one or more wireless access protocols (such as 4G LTE and 5G NR) used by the CBRS access points 124 to wirelessly communicate using the Citizens Broadband Radio Spectrum and to provide subscriber management.

In the example shown in FIG. 1, the private radio access network 104 also supports the use of licensed RF spectrum that is dedicated to providing 4G LTE and/or 5G NR wireless service (for example, using the licensed RF spectrum licensed to a public wireless service operator). For example, as shown in FIG. 1, the private radio access network 104 includes at least one 5G NR base station 130 (which is also referred to as a "gNodeB" or "gNB").

In the exemplary embodiment shown in FIG. 1, each gNB 130 is implemented in a distributed manner in which each gNB 130 is partitioned into at least one central unit (CU) 132, at least one distributed unit (DU) 134, and one or more radio units (RUs) 136. Each CU 132 implements Layer 3 and non-time critical Layer 2 functions for the associate gNB 130. Each DU 134 is configured to implement the time critical Layer 2 functions and at least some of the Layer 1 (also referred to as the Physical Layer) functions for the associated gNB 130. In this example, each RU 136 is configured to implement the radio frequency (RF) interface and the physical layer functions for the associated gNB 130 that are not implemented in the DU 134.

In the exemplary configuration shown in FIG. 1, a single CU 132 serves a single DU 134, and the DU 134 shown in FIG. 1 serves three RUs 136. However, the configuration shown in FIG. 1 is only one example; other numbers of CUs 132, DUs 134, and RUs 136 can be used. Also, the number of DUs 134 served by each CU 132 can vary from CU to CU; likewise, the number of RUs 136 served by each DU 134 can vary from DU to DU.

Generally, each RU 136 is remotely located from each of the other RUs 136 as well as from the CU 132 and DU 134 serving it. Each RU 136 is communicatively coupled to the DU 134 serving it via a fronthaul network. Each RU 136 includes one or more network interfaces to couple that RU 136 to the fronthaul network. In this example, the fronthaul network is implemented using the local area network 120 deployed at the site 106 and each RU 136 and the physical nodes on which each serving DU 134 is implemented includes suitable network interfaces to couple the RU 136 and the nodes to the local area network 120 in order to facilitate communications between the DU 134 and the RUs 136.

In this example, the 5G NR gNB 130 is configured to wirelessly communicate with one or more 5G NR wireless end devices 116 using the licensed RF spectrum licensed to one or more wireless operators. In such an example, each CU 132 is configured to communicate with the 5G core network (not shown) of the associated wireless operator using an appropriate backhaul network (typically, a public wide area network 122 such as the Internet).

The private radio access network 104 can also include other types of base stations. For example, in the embodiment shown in FIG. 1, private radio access network 104 also includes at least one 4G LTE base station 138 (which is also referred to as a "evolved NodeB," "eNodeB", or "eNB" 138).

In the exemplary embodiment shown in FIG. 1, each eNB 138 is implemented in a distributed manner in which each eNB 138 is partitioned into at least one baseband processing unit (BBU) 140 and at least one remote radio head (RRH) 142. Each BBU 140 implements Layer 3 and Layer 2 functions for the associated eNB 138 and at least some of the Layer 1 functions for the associated eNB 138. In this example, each RRH 142 is configured to implement the radio frequency (RF) interface and the physical layer functions for the associated eNB 138 that are not implemented in the BBU 140.

In the exemplary configuration shown in FIG. 1, a single BBU 140 serves three RRHs 142. However, the configuration shown in FIG. 1 is only one example; other numbers of BBUs 140 and RRHs 142 can be used.

Generally, each RRH 142 is remotely located from each of the other RRHs 1420 as well as from the BBU 140 serving it. Each RRH 142 is communicatively coupled to the BBU 140 serving it via a fronthaul network or links. Each RRH 142 and BBU 140 includes one or more respective network interfaces to couple that RRH 142 or BBU 140 to the fronthaul network or links.

In this example, the fronthaul network is implemented using the local area network 120 deployed at the site 106 and each BBU 140 and RRH 142 includes suitable network interfaces to couple the BBU 140 and RRH 142 to the local area network 120 in order to facilitate communications between the BBU 140 and the RRHs 142. In this configuration, each BBU 140 and RRH 142 natively supports a functional split suitable for using the local area network 120 as a fronthaul network. The eNB 138 and the fronthaul therefor can be implemented in other ways. For example, a BBU 140 can be communicatively coupled to the corresponding one or more RRHs 142 served by that BBU 140 using legacy synchronous point-to-point optical links (for example, point-to-point optical links using the Common Public Radio Interface (CPRI)). Also, where a BBU 140 or RRH 142 does not natively support a functional split suitable for using the local area network 120 as a fronthaul network, one or more fronthaul gateways can be used to communicatively couple the BBU 140 or RRH 142 to the local area network 120, where each fronthaul gateway performs any encapsulation or data conversion necessary for the local area network 120 to be used as the fronthaul.

In this example, the 4G LTE eNB 138 is configured to wirelessly communicate with one or more 4G LTE wireless end devices 116 using the licensed RF spectrum licensed to one or more wireless operators. In such an example, each BBU 140 is configured to communicate with the 4G core network (not shown) of the associated wireless operator using an appropriate backhaul network (typically, a public wide area network 122 such as the Internet).

Moreover, in the example shown in FIG. 1, at least one 4G LTE eNB 138 is coupled to a distributed antenna system (DAS) 144 in order to expand the coverage area of the eNB 138. The DAS 144 comprises one or more DAS master units (MUs) 146 that are communicatively coupled to one or more DAS remote antenna units (RAUs) 148 via one or more cables. Each remote antenna unit 148 can be communicatively coupled directly to one or more of the DAS master units 146 or indirectly via one or more other DAS remote antenna units 148 and/or via one or more expansion (or other intermediary) units (not shown).

Each DAS master unit 146 is communicatively coupled to one or more base stations either directly or indirectly using a donor antenna. In the example shown in FIG. 1, the DAS master unit 146 is directly communicatively coupled to the antenna ports of a RRH 142 used to implement the 4G LTE eNB 138 to which the DAS 144 is coupled.

In general, each DAS master unit 146 is configured to receive one or more downlink signals from one or more base stations and generate one or more downlink transport signals derived from the one or more base station downlink signals and to transmit one or more downlink transport signals to one or more of the DAS remote antenna units 148. Each DAS remote antenna unit 148 is configured to receive the downlink transport signals transmitted to it from one or more DAS master units 146 and to use the received downlink transport signals to generate one or more downlink radio frequency signals that are radiated from one or more coverage antennas associated with that DAS remote antenna unit 148 for reception by the WEDs 116. In this way, the DAS 144 increases the coverage area for the downlink capacity provided by the base station 138.

Also, each DAS remote antenna unit 148 is configured to receive one or more uplink radio frequency signals transmitted from the WEDs 116. These signals are analog radio frequency signals. Each remote antenna unit 148 is also configured to generate one or more uplink transport signals derived from the one or more remote uplink radio frequency signals and to transmit one or more uplink transport signals to one or more of the DAS master units 146. Each DAS master unit 146 is configured to receive the respective uplink transport signals transmitted to it from one or more DAS remote antenna units 148 and to use the received uplink transport signals to generate one or more base station uplink radio frequency signals that are provided to the one or more base stations associated with that DAS master unit 146. Typically, this involves, among other things, combining or summing uplink signals received from multiple DAS remote antenna units 148 in order to produce the base station signal provided to the base station 138. In this way, the DAS 144 increases the coverage area for the uplink capacity provided by the base station 138.

In the following description, a "physical entity" refers to an entity that is implemented as a so-called "physical network function" (PNF), and a "virtual entity" refers to an entity that is implemented as a so-called "virtual network function" (VNF). Examples of physical entities are the CBRS access points 124, the 5G remote units 136, the 4G BBUs 140, 4G remote radio heads 142, and the DAS 144 (including the DAS master units 146 and the DAS remote antenna units 148) shown in FIG. 1. Examples of virtual entities are the SAS 126, CBRS core 128, 5G CU 132, and 5G DU 134.

Although multiple types of wireless service can be provided at the site 106 of the private enterprise using the hyperscale network 102 in the example shown in FIG. 1 (with appropriate physical and virtual entities being deployed at the site 106 and using the hyperscale network 102, respectively), it is to be understood that different numbers or types of wireless service can be provided at the site 106 of the private enterprise using the hyperscale network 102 (with appropriate physical and virtual entities being deployed at the site 106 and using the hyperscale network 102, respectively). For example, only CBRS service can be provided at the site 106 of the private enterprise using the hyperscale network 102 (with appropriate physical and virtual entities being deployed at the site 106 and using the hyperscale network 102, respectively).

Historically, a private enterprise wishing to deploy, configure, and monitor a private radio access network at a site of the private enterprise would typically need to use workflows and device management system (DMS) features designed for use by wireless service operators to deploy, configure, and monitor public radio access networks. These workflows and DMS features require the private enterprise to separately configure various aspects of the radio access network, often requiring the private enterprise to separately configure specific entities used to implement the radio access network. For example, a DMS can be configured to enable a user associated with the private enterprise to do this by interacting directly with the DMS (for example, using a web-based application implemented by the DMS) or indirectly using a special-purpose network management system (NMS) that in turn interacts with the DMS using an application programming interface implemented and exposed by the DMS. However, these workflows and DMS and NMS features are wireless operator centric and typically require the users to have extensive knowledge about radio access networks and the entities and protocols used to implement them. As a result, these wireless-operator-centric workflows and DMS and NMS features are not suitable for use with users who do not have such knowledge (for example, information technology (IT) workers of a private enterprise).

In the example shown in FIG. 1, the third-party hyperscale network 102 comprises a general-purpose hyperscale services portal 150 via which users can subscribe to and manage services provided using the third-party hyperscale network 102. More specifically, in this example, the hyperscale services portal 150 comprises a services marketplace 152 via which a user is able to view and subscribe to various services that can be provided using the third-party hyperscale network 102. In this example, the service marketplace 152 includes a private radio access network service entry 154 that a user associated with the private enterprise is able to select in order for the private enterprise to "subscribe" to "wireless service" at the site 106 that is provided using the private radio access network 104. Also, in this example, the hyperscale services portal 150 comprises a device management system and service orchestration (DMS/SO) controller 156 that is configured to initially configure and deploy physical and virtual entities used to implement private radio access networks deployed at sites of subscribers.

Also, in this example, the hyperscale services portal 150 comprises a management console 158 via which a user is able to monitor and control the various services to which the user is subscribed. The management console 158 includes (while the private enterprise is subscribed to the wireless service provided via the private radio access network 104 deployed at the site 106) a private radio access network service entry 160 that a user associated with the private enterprise is able to interact with in order to monitor and control the subscribed-to wireless service provided at the site 106 using the private radio access network 104.

FIG. 2 comprises a high-level flowchart illustrating one exemplary embodiment of a method 200 of enabling a private enterprise to subscribe to wireless service provided at a site of the private enterprise using a private radio access network comprising one or more physical entities deployed at the site. The embodiment of method 200 shown in FIG. 2 is described here as being implemented using the system 100 described above in connection with FIG. 1. More specifically, the processing of method 200 is described here as primarily being implemented using the DMS/SO controller 156 and DMS/SO 168 (described below). However, it is to be understood that other embodiments can be implemented in other ways.

The blocks of the flow diagram shown in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel and/or in an event-driven manner). Also, most standard exception handling is not described for ease of explanation; however, it is to be understood that method 200 can and typically would include such exception handling. Moreover, one or more aspects of method 200 can be configurable or adaptive (either manually or in an automated manner).

Method 200 is performed in response to a user associated with the private enterprise using the services marketplace 152 of the general-purpose hyperscale services portal 150 to subscribe to wireless service at the site 106 being provided via the private radio access network 104 deployed at the site 106. The user can do this by selecting and interacting with the private RAN entry 154 in the services marketplace 152.

Method 200 comprises obtaining subscription information for providing the subscribed-to wireless service using the private radio access network 104 (block 202). This subscription information includes information about the subscriber (that is, the private enterprise), the site 106, and the private radio access network 104 (and the physical entities deployed (or to be deployed) at the site 106 for use therein). The DMS/SO controller 156 is configured to capture the subscription information in order to initially configure and deploy the physical and virtual entities used to implement the private radio access network 104 and any virtual entities that need to be deployed in the hyperscale cloud 108 (for example, in the regional clouds 112) to support the private radio access network 104. The subscription information can include general information captured by the hyperscale services portal 150 when the subscriber establishes an account with the hyperscale services portal 150 (for example, subscriber identity information) and specific information captured by the hyperscale services portal 150 in connection with the subscriber subscribing for the wireless service to be provided by the private radio access network 104 at the site 106. The hyperscale services portal 150 can be configured to prompt the subscriber to manually enter specific information about the site 106, the private radio access network 104, the type of wireless service to be provided (4G LTE or 5G wireless service provided using Citizens Broadband Radio Spectrum (also referred to here as "CBRS service"), 4G LTE wireless service provided using licensed RF spectrum that is dedicated to providing 4G LTE wireless service (for example, using the licensed RF spectrum licensed to a public wireless service operator) (also referred to here as "4G LTE service"), or 5G NR wireless service provided using licensed RF spectrum that is dedicated to providing 5G NR wireless service (for example, using the licensed RF spectrum licensed to a public wireless service operator) (also referred to here as "5G NR service")), and the make and model of the physical entities deployed (or to be deployed) in the private radio access network 104.

Method 200 further comprises determining initial configurations for any physical entities deployed at the site 106 for use in the private radio access network 104 to provide the subscribed-to wireless service (block 204). In the example described here in connection with FIG. 1, the DMS/SO controller 156 is configured to identify any physical entities deployed at the site 106 for use in the private radio access network 104 to provide the subscribed-to wireless service. This is done using the subscription information captured by the hyperscale services portal 150 in connection with the subscriber subscribing for the wireless service to be provided by the private radio access network 104. The physical entities deployed at the site 106 for use in the private radio access network 104 to provide the subscribed-to wireless service can include, for example, CBRS access points 124, 5G remote units 136, and 4G BBUs 140, 4G RRHs 142, and DAS equipment (for example, DAS master units 146 and DAS remote antenna units 148).

As used here, an "initial" configuration for a physical entity comprises information or settings (for example, Internet Protocol (IP) addresses, uniform resource identifiers, etc.) that enable the physical entity to communicate with other entities and that enable other entities to communicate with that physical entity. Examples of such other entities include, for example, other physical entities deployed at the site 106 or virtual entities deployed in the hyperscale network 102, vendor clouds 127 or 162, or elsewhere (for example, in a public core network of a wireless operator). As explained in more detail below, each such physical entity uses the initial configuration to establish a connection with a suitable device management system and service orchestration entity (DMS/SO) 168 deployed in the hyperscale cloud 108 (more specifically, in the regional clouds 112 in the example shown in FIG. 1) for the associated private radio access network 104, where the DMS/SO 168 for the private radio access network 104 provides a "final" configuration to the physical entity to configure it to provide the subscribed-to wireless service. Also, each such physical entity uses the initial configuration to establish connections with any virtual entities that are implemented in a public core of a wireless operator or a vendor cloud 127 (for example, a SAS 126). In this example, the DMS/SO controller 156 is configured to determine the initial configurations for the identified physical entities based on what type of wireless services is being provided and the various other entities each such physical entity will need to communicate with and that will need to communicate with it.

Method 200 further comprises storing the determined initial configurations for the physical entities in respective vendor clouds 162 (block 206). In the example shown in FIG. 1, each vendor cloud 162 comprises a registry 164 and certificate authority (CA) 166. In this example, the DMS/SO controller 156 is configured to store the respective initial configuration for each of the identified physical entities in the registry 164 of the vendor cloud 162 operated by the vendor of that physical entity. Also, in this example, the DMS/SO controller 156 is configured to instruct the CA 166 of the respective vendor cloud 162 to generate an "initial" digital certificate used by that physical entity to securely communicate with a certificate authority (CA) 167 deployed in the hyperscale cloud 108 in order to obtain a "final" digital certificate. For each such physical entity, the CA 167 deployed in the hyperscale cloud 108 generates, and provides the physical entity with, a final digital certificate. The final digital certificate is used by the physical entity to establish a secure tunnel with a security gateway 174 deployed in the hyperscale cloud 108 that is used for communicating with other virtual entities deployed in the hyperscale cloud 108. In this example, each physical entity deployed in a private radio access network 104 is configured to download its initial configuration from the registry 164 in the respective vendor cloud 162 operated by the vendor of that physical entity and to obtain any encryption keys needed by that physical entity from the CA 166 in that vendor cloud 162.

Method 200 further comprises deploying, in the hyperscale network 102, any virtual entities needed to provide the subscribed-to wireless service at the site 106 using the private radio access network 104 (block 208). In this example, the DMS/SO controller 156 is configured to identify any virtual entities needed to provide the subscribed-to wireless service at the site 106 using the private radio access network 104 based on the type of wireless service that is to be provided (for example, CBRS service, 5G NR service, and 4G LTE service), the geographic location of the site 106, and the make and model of the identified physical entities being used. The DMS/SO controller 156 is also configured to cause any needed virtual entities to be deployed in a suitable part of the hyperscale network 102. The DMS/SO controller 156, in this example, determines an "initial" configuration for each of the deployed virtual entities that includes information or settings (for example, IP addresses, uniform resource identifiers, etc.) that enable the virtual entity to communicate with other entities and that enable other entities to communicate with that virtual entity. The DMS/SO controller 156 causes the deployed virtual entities to be configured in accordance with the initial configuration. As noted below, the DMS/SO 168 for the private radio access network 104 provides a "final" configuration to each virtual entity to configure it to provide the subscribed-to wireless service.

For example, if a suitable device management system and service orchestration entity (DMS/SO) 168 has not already been deployed in the hyperscale network 102 for use with the private radio access network 104 at the site 106, the DMS/SO controller 156 causes multiple instances of the DMS/SO 168 to be instantiated and deployed in multiple regional clouds 112. The load balancer 114 is configured to balance the demand and load for, and share and synchronize the runtime state of, the DMS/SO 168 across the multiple DMS/SO instances deployed in the multiple regional clouds 112. In the following description, references to the DMS/SO 168 are to be understood as also referring to the various DMS/SO instances running in the regional clouds 112. Also, in this example, the various virtual entities deployed in the hyperscale network 102 are configured to interact with a file server 170 that is used to store files for those virtual entities. Moreover, in this example, the physical entities deployed in the private radio access network 104 are configured to download firmware images from a firmware image server 172. If a suitable file server 170 and firmware image server 172 have not already been deployed in the hyperscale network 102 for use with the private radio access network 104 at the site 106, the DMS/SO controller 156 causes multiple instances of a file server 170 and firmware image server 172 to be instantiated and deployed in the multiple regional clouds 112 along with the DMS/SO 168 (and other virtual entities) deployed for the private radio access network 104. The load balancer 114 is configured to balance the demand and load for, and share and synchronize the runtime state of, the file server 170 and firmware image server 172 across the multiple instances deployed in the multiple regional clouds 112. In the following description, references to file server 170 and firmware image server 172 are to be understood as also referring to the various instances of file server 170 and firmware image server 172, respectively, running in the regional clouds 112.

For example, if CBRS service is to be provided at the site 106, one or more private cores 128 will need to be deployed in the hyperscale network 102 (if a suitable one or more private cores 128 have not already been deployed in the hyperscale network 102). In this example, the number and type of private cores 128 that will need to be deployed depends on the underlying wireless protocols being used to provide the CBRS service. That is, if 4G LTE is used as a wireless protocol used to provide the CBRS service, a private 4G core 128 will need to be deployed (if suitable a private 4G core 128 has not already been deployed in the hyperscale network 102), and if 5G NR is used as a wireless protocol used to provide the CBRS service, a private 5G core 128 will need to be deployed (if suitable a private 5G core 128 has not already been deployed in the hyperscale network 102). If the DMS/SO controller 156 determines that a private core 128 needs to be deployed, the DMS/SO controller 156 causes multiple instances of a suitable private core 128 to be instantiated and deployed in multiple regional clouds 112. The load balancer 114 is configured to balance the demand and load for, and share and synchronize the runtime state of, the private core 128 across the multiple instances deployed in the multiple regional clouds 112. In the following description, references to each private core 128 are to be understood as also referring to the various instances of the private core 128 running in the regional clouds 112.

If 5G NR service is to be provided at the site 106, a 5G CU 132 and 5G DU 134 will need to be deployed in the hyperscale network 102 (if a suitable 5G CU 132 and 5G DU 134 have not already been deployed in the hyperscale network 102). If the DMS/SO controller 156 determines that a 5G CU 132 and/or 5G DU 134 need to be deployed, the DMS/SO controller 156 causes a suitable 5G CU 132 and/or 5G DU 134 to be deployed in the hyperscale edge 110 of the hyperscale network 102 at the site 106 where the private radio access network 104 is to be deployed.

Method 200 further comprises instructing the private enterprise to cause the physical entities to perform the initial bootstrap process (block 210). These physical entities are the ones deployed at the site 106 to provide the subscribed-to wireless service using the private radio access network 104. For example, the DMS/SO controller 156 can be configured to cause a message to be displayed in the hyperscale services portal 150 (for example, using the private RAN service entry 154 of the services marketplace 152 or using the private RAN service entry 160 of the management console 158) instructing a user associated with the private enterprise to cause the physical entities to perform the initial bootstrap process (which the user can do, for example, by connecting the physical entities to the local area network 120 deployed at the site 106 and then powering on the physical entities). As noted above, in this example, each physical entity deployed in a private radio access network 104 is configured to download its initial configuration from the registry 164 in the respective vendor cloud 162 operated by the vendor of that physical entity and to obtain an initial digital certificate.

Each physical entity configures itself in accordance with the downloaded initial configuration and uses the initial digital certificate to obtain a final digital certificate from the CA 167 in the hyperscale cloud 108 which the physical entity uses for establishing secure tunnels to the virtual entities deployed in the hyperscale cloud 108 via a security gateway 174 deployed in the hyperscale cloud 108.

Method 200 further comprises providing final configurations for any physical and virtual entity used to provide the subscribed-to wireless service at the site 106 using the private radio access network 104 (block 212). In this example, the DMS/SO 168 is configured to determine the final configurations for the physical entities and virtual entities based on what type of wireless services is being provided, the geographic location of the site 106, and the make and model of the physical and virtual entities being used. For example, a respective default final configuration for each different make and model of the physical and virtual entities for each distinct geographic location in which a hyperscale edge 110 of the hyperscale network 102 is deployed can be predetermined and stored in a data store accessible by the DMS/SO 168. Then, when the DMS/SO 168 needs to determine a final configuration for a particular physical or virtual entity for use with a private radio access network 104 at a particular site 106, the DMS/SO 168 retrieves the default final configuration stored in the data store for the make and model of that physical or virtual entity and for the geographic location of that site 106. Then, the DMS/SO 168 configures each physical and virtual entity used to provide the subscribed-to wireless service at the site 106 using the private radio access network 104. In this example, the DMS/SO 168 comprises a southbound interface 178 that is configured to enable the DMS/SO 168 to interact with the entities used to implement the private radio access network 104 (for example, to provide the final configurations to the entities). After providing the final configuration to the physical and virtual entities, the private radio access network 104 is able to provide the subscribed-to wireless service at the site 106 using the physical entities deployed at the site 106 and any virtual entities deployed in the hyperscale network 102 along with any virtual entities deployed elsewhere (for example, a public 4G or 5G core deployed and operated by a public wireless service operator or a SAS 126 deployed in a vendor cloud 127).

Method 200 further comprises using a northbound interface 176 of the DMS/SO 168 to control and monitor the private network access 104 via the general-purpose management console 158 of the hyperscale services portal 150 (block 214). The DMS/SO 168 also comprises a northbound interface 176 that is configured to enable the DMS/SO 168 to interact with other entities (that is, entities other than entities used to implement the private radio access network 104). The southbound interface 178 and northbound interface 176 can each be implemented as a respective application programming interface (API). In this example, the DMS/SO controller 156 is configured to use the northbound interface 176 of the DMS/SO 158 in order to control and monitor the private radio access network 104 and use the private RAN service entry 160 of the management console 158 as a user-interface by which DMS/SO-related output data is displayed for a user and DMS/SO-related input data is prompted for and received.

By using the service marketplace 152 and management console 158 to subscribe to and monitor and control the wireless service provided using the private radio access network 104 deployed at the site 106 of the private enterprise, a user associated with the private enterprise (for example, a general IT technician) is able to deploy, configure, monitor, and control the private radio access network 104 at the site 106 of the private enterprise without having to use wireless-operator-centric workflows and DMS and NMS features that require extensive knowledge about radio access networks and the entities and protocols used to implement them. Instead, familiar workflows and features that are otherwise used to subscribe to, deploy, configure, monitor, and control other services provided via the third-party hyperscale network 102 can be used.

Each physical entity and virtual entity described, and any of the specific features described here as being implemented thereby, can be implemented in hardware, software, or combinations of hardware and software, and the various implementations (whether hardware, software, or combinations of hardware and software) can also be referred to generally as "circuitry," a "circuit," or "circuits" that is or are configured to implement at least some of the associated functionality. When implemented in software, such software can be implemented in software or firmware executing on one or more suitable programmable processors (or other programmable device) or configuring a programmable device (for example, processors or devices included in or used to implement special-purpose hardware, general-purpose hardware, and/or a virtual platform). In such a software example, the software can comprise program instructions that are stored (or otherwise embodied) on or in an appropriate non-transitory storage medium or media (such as flash or other non-volatile memory, magnetic disc drives, and/or optical disc drives) from which at least a portion of the program instructions are read by the programmable processor or device for execution thereby (and/or for otherwise configuring such processor or device) in order for the processor or device to perform one or more functions described here as being implemented the software. Such hardware or software (or portions thereof) can be implemented in other ways (for example, in an application specific integrated circuit (ASIC), etc.).

Other embodiments are implemented in other ways.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes a system for enabling a private enterprise to subscribe to wireless service provided at a site of the private enterprise using a private radio access network comprising one or more physical entities deployed at the site, the system comprising: a third-party hyperscale network comprising a hyperscale cloud and a hyperscale edge, wherein the hyperscale edge is deployed at the site of the private enterprise and the hyperscale cloud is deployed remote from the site of the private enterprise; wherein the hyperscale network is configured to do the following: obtain subscription information for providing the wireless service at the site using the private radio access network; determine initial configurations for the one or more physical entities deployed at the site; store the determined initial configurations in one or more vendors clouds; deploy, in the hyperscale network, one or more virtual entities needed to provide the wireless service at the site using the private radio access network; instruct the private enterprise to cause the one or more physical entities deployed at the site to perform initial bootstrap processes whereby the one or more physical entities download the determined initial configurations stored in the one or more vendor clouds for use thereby in communicating with at least one of the one or more virtual entities; and provide final configurations to the one or more physical entities and the one or more virtual entities for use thereby in configuring the one or more physical entities and the one or more virtual entities to provide the wireless service at the site using the private radio access network.

Example 2 includes the system of Example 1, wherein a device management system (DMS) is deployed in the hyperscale network, wherein the DMS comprises: a southbound interface to interact with the one or more physical entities and the one or more virtual entities; and a northbound interface to interact with entities other than the physical and virtual entities used to provide the wireless service at the site using the private radio access network.

Example 3 includes the system of Example 2, wherein the hyperscale network is further configured to use the northbound interface of the DMS to control and monitor the physical and virtual entities used to provide the wireless service at the site using the private radio access network.

Example 4 includes the system of any of Examples 2-3, wherein the DMS is configured to determine and provide the final configurations to the one or more physical entities and the one or more virtual entities.

Example 5 includes the system of any of Examples 1-4, wherein the hyperscale network comprises a general-purpose services portal configured to enable users of the hyperscale network to subscribe to services provided using the hyperscale network, wherein the general-purpose services portal is configured so that the services comprise the wireless service provided at the site using the private radio access network.

Example 6 includes the system of Example 5, wherein the general-purpose services portal is configured to enable users of the hyperscale network to control and monitor services provided using the hyperscale network, wherein the general-purpose services portal is configured to enable the private enterprise to control and monitor the physical and virtual entities used to provide the wireless service at the site using the private radio access network.

Example 7 includes the system of any of Examples 1-6, wherein the one or more physical entities comprise one or more Citizens Broadband Radio Service Devices (CBSDs).

Example 8 includes the system of Example 7, wherein said one or more virtual entities needed to provide the wireless service at the site using the private radio access network comprises at least one private CBRS core.

Example 9 includes the system of Example 8, wherein the least one private CBRS core comprises at least one of: a private Fourth Generation Long Term Evolution (4G LTE) core and Fifth Generation New Radio (5G NR) core.

Example 10 includes the system of any of Examples 1-9, wherein the one or more physical entities comprise one or more Fifth Generation New Radio (5G NR) radio units (RUs).

Example 11 includes the system of Example 10, wherein said any virtual entity needed to provide the wireless service at the site using the private radio access network comprises at least one of: a 5G NR central unit (CU); and a 5G NR distributed unit (DU).

Example 12 includes the system of any of Examples 1-11, wherein the one or more physical entities comprise one or more Fourth Generation Long Term Evolution (4G LTE) baseband units (BBUs) and one or more 4G LTE remote radio heads (RRHs).

Example 13 includes the system of any of Examples 1-12, wherein the one or more physical entities comprises a distributed antenna system.

Example 14 includes a method of enabling a private enterprise to subscribe to wireless service provided at a site of the private enterprise using a private radio access network comprising one or more physical entities deployed at the site, the method comprising: obtaining, by a third-party hyperscale network, subscription information for providing the wireless service at the site using the private radio access network, the third-party hyperscale network comprising a hyperscale cloud and a hyperscale edge, wherein the hyperscale edge is deployed at the site of the private enterprise and the hyperscale cloud is deployed remote from the site of the private enterprise; determining, by the hyperscale network, initial configurations for the one or more physical entities deployed at the site; storing the determined initial configurations in one or more vendors clouds; deploying, in the hyperscale network, one or more virtual entities needed to provide the wireless service at the site using the private radio access network; and instructing the private enterprise to cause the one or more physical entities deployed at the site to perform initial bootstrap processes whereby the one or more physical entities download the determined initial configurations stored in the one or more vendor clouds for use thereby in communicating with at least one of the one or more virtual entities; and providing final configurations to the one or more physical entities and the one or more virtual entities for use thereby in configuring the one or more physical entities and the one or more virtual entities to provide the wireless service at the site using the private radio access network.

Example 15 includes the method of Example 14, wherein a device management system (DMS) is deployed in the hyperscale network, wherein the DMS comprises: a southbound interface to interact with the one or more physical entities and the one or more virtual entities; and a northbound interface to interact with entities other than the physical and virtual entities used to provide the wireless service at the site using the private radio access network.

Example 16 includes the method of Example 15, further comprising using the northbound interface of the DMS to control and monitor the physical and virtual entities used to provide the wireless service at the site using the private radio access network.

Example 17 includes the method of any of Examples 15-16, wherein the DMS is configured to determine and provide the final configurations to the one or more physical entities and the one or more virtual entities.

Example 18 includes the method of any of Examples 14-17, wherein the hyperscale network comprises a general-purpose services portal configured to enable users of the the hyperscale network to subscribe to services provided using the hyperscale network, wherein the general-purpose services portal is configured so that the services comprise the wireless service provided at the site using the private radio access network.

Example 19 includes the method of Example 18, wherein the general-purpose services portal is configured to enable users of the hyperscale network to control and monitor services provided using the hyperscale network, wherein the general-purpose services portal is configured to enable the private enterprise to control and monitor the physical and virtual entities used to provide the wireless service at the site using the private radio access network.

Example 20 includes the method of any of Examples 14-19, wherein the one or more physical entities comprise one or more Citizens Broadband Radio Service Devices (CBSDs).

Example 21 includes the method of Example 20, wherein said one or more virtual entities needed to provide the wireless service at the site using the private radio access network comprises at least one private CBRS core.

Example 22 includes the method of Example 21, wherein the least one CBRS core comprises at least one of: a private Fourth Generation Long Term Evolution (4G LTE) core and Fifth Generation New Radio (5G NR) core.

Example 23 includes the method of any of Examples 14-22, wherein the one or more physical entities comprise one or more Fifth Generation New Radio (5G NR) radio units (RUs).

Example 24 includes the method of Example 23, wherein said any virtual entity needed to provide the wireless service at the site using the private radio access network comprises at least one of: a 5G NR central unit (CU); and a 5G NR distributed unit (DU).

Example 25 includes the method of any of Examples 14-24, wherein the one or more physical entities comprise one or more Fourth Generation Long Term Evolution (4G LTE) baseband units (BBUs) and one or more 4G LTE remote radio heads (RRHs).

Example 26 includes the method of any of Examples 14-25, wherein the one or more physical entities comprises a distributed antenna system.

What is claimed is:

1. A system for enabling a private enterprise to subscribe to wireless service provided at a site of the private enterprise using a private radio access network comprising one or more physical entities deployed at the site, the system comprising:
   a third-party hyperscale network comprising a hyperscale cloud and a hyperscale edge, wherein the hyperscale edge is deployed at the site of the private enterprise and the hyperscale cloud is deployed remote from the site of the private enterprise;
   wherein the third-party hyperscale network is configured to do the following:
      obtain subscription information for providing the wireless service at the site using the private radio access network;
      determine initial configurations for the one or more physical entities deployed at the site;
      store the determined initial configurations in one or more vendors clouds;
      deploy, in the third-party hyperscale network, one or more virtual entities needed to provide the wireless service at the site using the private radio access network;
      instruct the private enterprise to cause the one or more physical entities deployed at the site to perform initial bootstrap processes whereby the one or more physical entities download the determined initial configurations stored in the one or more vendor clouds for use thereby in communicating with at least one of the one or more virtual entities; and
      provide final configurations to the one or more physical entities and the one or more virtual entities for use thereby in configuring the one or more physical entities and the one or more virtual entities to provide the wireless service at the site using the private radio access network.

2. The system of claim 1, wherein a device management system (DMS) is deployed in the third-party hyperscale network, wherein the DMS comprises:
   a southbound interface to interact with the one or more physical entities and the one or more virtual entities; and
   a northbound interface to interact with entities other than the physical and virtual entities used to provide the wireless service at the site using the private radio access network.

3. The system of claim 2, wherein the third- party hyperscale network is further configured to use the northbound interface of the DMS to control and monitor the physical and virtual entities used to provide the wireless service at the site using the private radio access network.

4. The system of claim 2, wherein the DMS is configured to determine and provide the final configurations to the one or more physical entities and the one or more virtual entities.

5. The system of claim 1, wherein the third-party hyperscale network comprises a general-purpose services portal configured to enable users of the third-party hyperscale network to subscribe to services provided using the third-party hyperscale network, wherein the general-purpose services portal is configured so that the services comprise the wireless service provided at the site using the private radio access network.

6. The system of claim 5, wherein the general-purpose services portal is configured to enable users of the third-party hyperscale network to control and monitor services provided using the third-party hyperscale network, wherein the general-purpose services portal is configured to enable the private enterprise to control and monitor the physical and virtual entities used to provide the wireless service at the site using the private radio access network.

7. The system of claim 1, wherein the one or more physical entities comprise one or more Citizens Broadband Radio Service Devices (CBSDs).

8. The system of claim 7, wherein said one or more virtual entities needed to provide the wireless service at the site using the private radio access network comprises at least one private (Citizens Broadband Radio Service) CBRS core.

9. The system of claim 8, wherein the least one private CBRS core comprises at least one of: a private Fourth Generation Long Term Evolution (4G LTE) core and Fifth Generation New Radio (5G NR) core.

10. The system of claim 1, wherein the one or more physical entities comprise one or more Fifth Generation New Radio (5G NR) radio units (RUs).

11. The system of claim 10, wherein said any virtual entity needed to provide the wireless service at the site using the private radio access network comprises at least one of:
  a 5G NR central unit (CU); and
  a 5G NR distributed unit (DU).

12. The system of claim 1, wherein the one or more physical entities comprise one or more Fourth Generation Long Term Evolution (4G LTE) baseband units (BBUs) and one or more 4G LTE remote radio heads (RRHs).

13. The system of claim 1, wherein the one or more physical entities comprises a distributed antenna system.

14. A method of enabling a private enterprise to subscribe to wireless service provided at a site of the private enterprise using a private radio access network comprising one or more physical entities deployed at the site, the method comprising:
  obtaining, by a third-party hyperscale network, subscription information for providing the wireless service at the site using the private radio access network, the third-party hyperscale network comprising a hyperscale cloud and a hyperscale edge, wherein the hyperscale edge is deployed at the site of the private enterprise and the hyperscale cloud is deployed remote from the site of the private enterprise;
  determining, by the third-party hyperscale network, initial configurations for the one or more physical entities deployed at the site;
  storing the determined initial configurations in one or more vendors clouds;
  deploying, in the third-party hyperscale network, one or more virtual entities needed to provide the wireless service at the site using the private radio access network;
  instructing the private enterprise to cause the one or more physical entities deployed at the site to perform initial bootstrap processes whereby the one or more physical entities download the determined initial configurations stored in the one or more vendor clouds for use thereby in communicating with at least one of the one or more virtual entities; and
  providing final configurations to the one or more physical entities and the one or more virtual entities for use thereby in configuring the one or more physical entities and the one or more virtual entities to provide the wireless service at the site using the private radio access network.

15. The method of claim 14, wherein a device management system (DMS) is deployed in the third-party hyperscale network, wherein the DMS comprises:
  a southbound interface to interact with the one or more physical entities and the one or more virtual entities; and
  a northbound interface to interact with entities other than the physical and virtual entities used to provide the wireless service at the site using the private radio access network.

16. The method of claim 15, further comprising using the northbound interface of the DMS to control and monitor the physical and virtual entities used to provide the wireless service at the site using the private radio access network.

17. The method of claim 15, wherein the DMS is configured to determine and provide the final configurations to the one or more physical entities and the one or more virtual entities.

18. The method of claim 14, wherein the third-party hyperscale network comprises a general-purpose services portal configured to enable users of the third-party hyperscale network to subscribe to services provided using the third-party hyperscale network, wherein the general-purpose services portal is configured so that the services comprise the wireless service provided at the site using the private radio access network.

19. The method of claim 18, wherein the general-purpose services portal is configured to enable users of the hyperscale network to control and monitor services provided using the hyperscale network, wherein the general-purpose services portal is configured to enable the private enterprise to control and monitor the physical and virtual entities used to provide the wireless service at the site using the private radio access network.

20. The method of claim 14, wherein the one or more physical entities comprise one or more Citizens Broadband Radio Service Devices (CBSDs).

21. The method of claim 20, wherein said one or more virtual entities needed to provide the wireless service at the site using the private radio access network comprises at least one private (Citizens Broadband Radio Service) CBRS core.

22. The method of claim 21, wherein the least one CBRS core comprises at least one of: a private Fourth Generation Long Term Evolution (4G LTE) core and Fifth Generation New Radio (5G NR) core.

23. The method of claim 14, wherein the one or more physical entities comprise one or more Fifth Generation New Radio (5G NR) radio units (RUs).

24. The method of claim 23, wherein said any virtual entity needed to provide the wireless service at the site using the private radio access network comprises at least one of:
  a 5G NR central unit (CU); and
  a 5G NR distributed unit (DU).

25. The method of claim 14, wherein the one or more physical entities comprise one or more Fourth Generation Long Term Evolution (4G LTE) baseband units (BBUs) and one or more 4G LTE remote radio heads (RRHs).

26. The method of claim 14, wherein the one or more physical entities comprises a distributed antenna system.

* * * * *